F. J. THOMAS.
HORSE CHECKING DEVICE.
APPLICATION FILED OCT. 8, 1908.
930,705.
Patented Aug. 10, 1909.
2 SHEETS—SHEET 1.
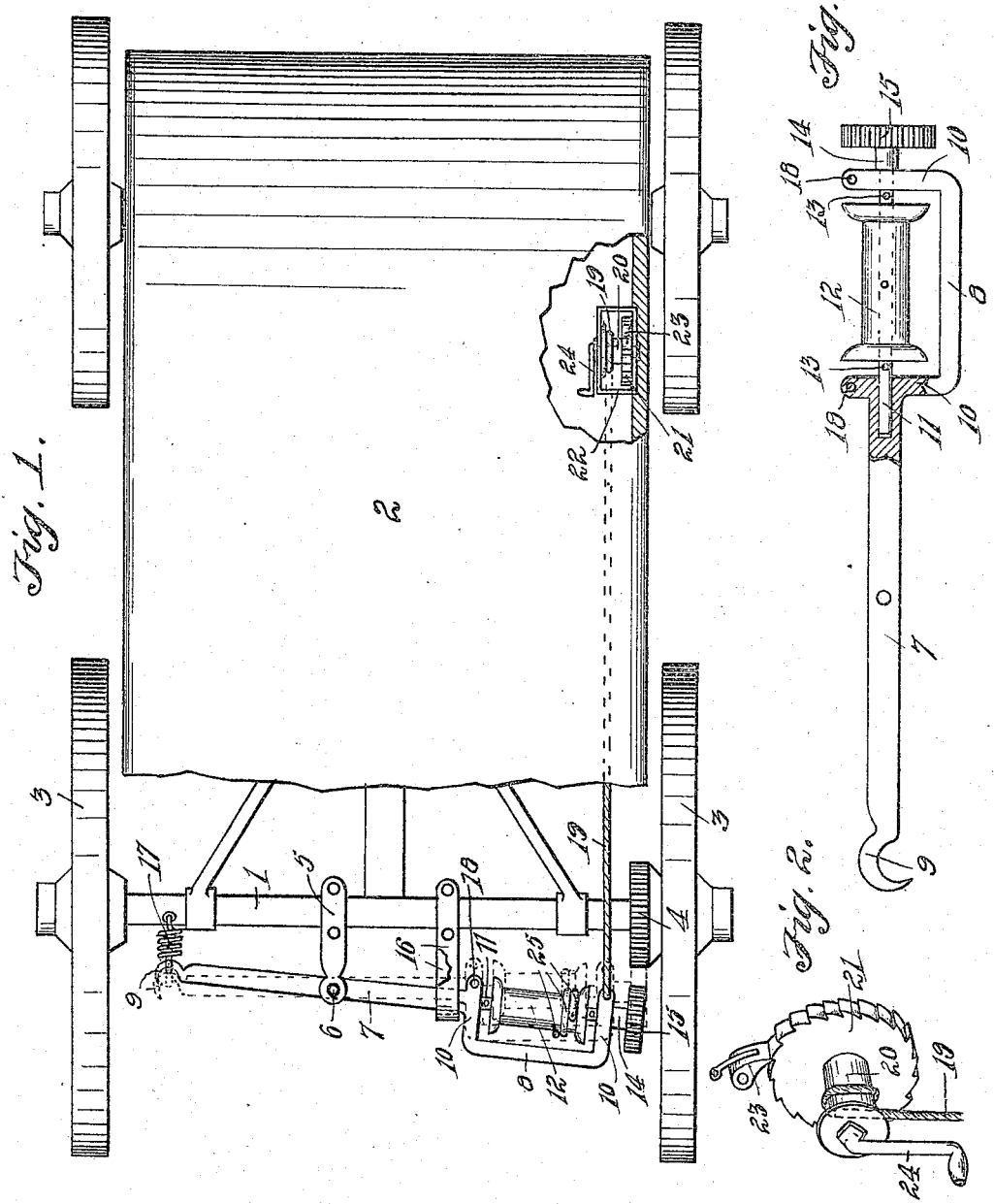
Witnesses:
Fred'k J. Larson
W. C. Smith
Inventor:
Francis J. Thomas.
By Joshua R. H. Potts
Attorney.

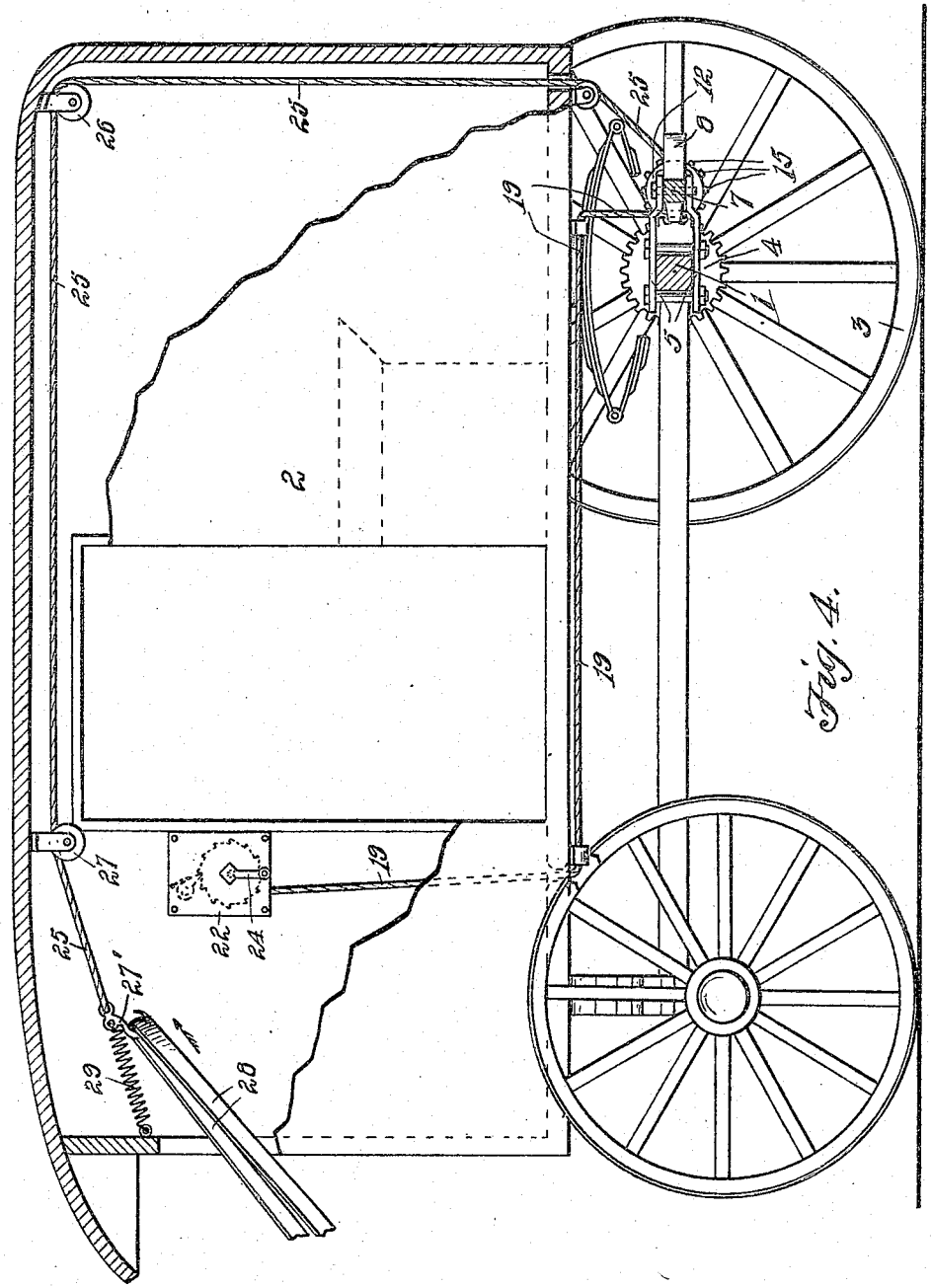

UNITED STATES PATENT OFFICE.

FRANCIS J. THOMAS, OF CHICAGO, ILLINOIS.

HORSE-CHECKING DEVICE.

No. 930,705.　　　Specification of Letters Patent.　　　Patented Aug. 10, 1909.

Application filed October 8, 1908. Serial No. 456,794.

*To all whom it may concern:*

Be it known that I, FRANCIS J. THOMAS, a citizen of the United States, residing at Chicago, county of Cook, and State of Illinois, have invented certain new and useful Improvements in Horse-Checking Devices, of which the following is a specification.

My invention relates to a horse-checking device, and has for its object to provide a simple and effective device adapted for use on a wagon or like vehicle by means of which the most fractious horse can be quickly brought to a stop should he be tempted to run away or wander off if left unattended.

It is impossible for a horse or team hitched to a wagon equipped with my invention to run away, as the horse or team will be pulled up the instant the vehicle begins to move.

With these and other objects in view, the invention consists in certain novel features of construction, arrangement and combination of parts as will be hereinafter more fully described and finally pointed out in the claim hereto appended.

Referring to the accompanying drawings forming a part of this specification wherein like characters of reference denote similar parts throughout the several views: Figure 1 is a plan view of a vehicle with a portion of the body broken away to more clearly show the manner in applying my improved checking device. Fig. 2 is a detail of the ratchet and pawl. Fig. 3 is a detail partly in section of the rotatably held spool and pivotally held lever. Fig. 4 is a side elevation of the wagon with portions broken away to more clearly show the manner in which my improved checking device is adapted to work.

My improved device is intended for attachment to vehicles of any character, preferably to the rear or fixed axle thereof.

Referring to the accompanying drawings the reference character 1 designates the fixed or rear axle and 2 the body or bed of the vehicle.

In carrying out the aim of my invention I provide one of the rear wheels 3 upon the inner side thereof with a gear 4, said gear being suitably secured to the hub thereof in any suitable or well known manner. Preferably the gear 4 is secured to the rear axle 1 upon the right-hand side of the wagon although not necessarily, as it can be secured to the opposite rear wheel if so desired.

Rigidly secured to the rear axle 1 at any suitable point is a supporting element 5 to which is pivotally connected by means of the pin 6 the lever 7 having the forked or U-shaped end 8 and the hook-shaped end 9. Rotatably mounted within the sides 10 of the forked or U-shaped end 8 of the lever 7 is a shaft upon which is rigidly secured a suitable spool 12. The shaft 11 is held in place and prevented from working out by means of the pins 13 which pass through the shaft adjacent each end of the spool 12. The outer end 14 of the shaft 11 it will be observed is provided with a gear 15 adapted when the lever is parallel with the rear axle 1 to mesh with the gear 4 which is secured to the hub of one of the rear wheels 3. When the lever 7 is lying parallel with the rear axle 1, the same is in a closed position. The lever 7 is guided to prevent an up and down rocking movement thereof by means of the U-shaped strap 16 which is suitably secured to the rear axle 1 adjacent the forked or U-shaped end 8 of the lever 7. The lever 7 is adapted to be held in an obliquely disposed position to the rear axle 1 when in an open position, and in order to accomplish this, I provide the rear axle 1 with a suitable coil-spring 17 which is adapted to be connected at one end with the hook-shaped end 9 of the lever 7 to pull said end in toward the rear axle, thereby causing the gear 15 to be normally held out of engagement or mesh with the gear 4.

The fork-shaped end 8 of the lever 7 is provided with a pair of eyelets or openings 18 through one of which passes and is secured a suitable cord, rope or the like 19 which is adapted to run forward under the bed or body of the vehicle to a suitable point near the front thereof and then upwardly through the bed to a drum 20 which is integral with a ratchet 21, which in turn is suitably mounted within a bracket or casing 22 secured to the side of the vehicle bed or body 2. The ratchet is held from slipping back by means of the spring held dog 23, as clearly shown in Fig. 2, and further the ratchet is provided with a handle 24 for rotating the same when it is desired to cause the gear 15 to mesh with the gear 4.

Suitably secured at one end to the spool 12 is a suitable cord, rope or the like 25 which extends from the spool 12 to one corner or other suitable point of the vehicle bed, then upwardly through the bed to a pulley 26 over which it is adapted to pass to a second pulley 27 located near the forward end of the vehicle, said cord or the like 25 being provided at its end with a hook-shaped element 27 adapted to receive and hold the reins 28 of a harness when the driver leaves the vehicle. This hook-shaped element 27 is connected to a weak coiled spring 29 which at its opposite end is suitably secured to the front of the vehicle body so as to hold the hook-shaped element 27 and cord 25 from hanging down thereby taking up the slack therein.

The operation of my invention will now be explained. The driver on stopping at a place and before leaving the vehicle passes the lines over the hook-shaped element 27 as clearly shown in Fig. 4. He then turns the handle 24 so as to wind the cord 19 around the drum 20 which causes the lever or bar 7 to take a position parallel with the rear axle 1, thus bringing the gear 15 into mesh with the gear 4. The dog 23 holds the ratchet in a locked position so that the gear 15 cannot disengage itself from gear 4 until said dog 23 is raised by the driver so as to allow the spring 17 to pull the lever inward at its short or hooked end. Now, if the horse or team should start to run or wander away before the driver's return to the vehicle, the spool 12 secured to the shaft 11 will rotate, thus causing the cord 25 to wind around the spool 12, thereby drawing the reins or lines taut, which will stop the team.

It will be readily understood from the foregoing description that I provide a simple and durable means which will prevent a horse or team from running or wandering away in the absence of the driver.

It is, of course, understood that my invention may be applied to all styles of vehicles and further I do not wish to limit myself to the exact details of construction, as these may be modified to a certain extent without departing from the principle, or scope of my invention.

Having described my invention what I claim as new, and desire to secure by Letters Patent, is:

In a device of the class described, a vehicle having the usual rear axle and rear wheels in combination with a gear rigidly secured to the hub of one of the rear wheels, a lever centrally fulcrumed adjacent the rear axle and having a U-shaped end, a shaft rotatably mounted in said U-shaped end and in alinement with said lever, a spool fixed to said shaft, a gear secured to the outer end of said shaft, a hook on the opposite end of said lever, a coil-spring connected with said hook and the rear axle for normally holding said gears out of engagement, a ratchet having a drum integral therewith secured to the bed or body of the vehicle, a handle for rotating said drum and said ratchet, a dog adapted to engage said ratchet, a cord connecting said drum with the U-shaped end of said lever for bringing said gears into mesh, a cord secured at one end to said spool and adapted to be wound thereon, said cord passing upwardly from said spool to the top of the vehicle and thence to the front thereof, a spring connected to the front end of said cord and to the front of the vehicle above the driver for taking up the slack in said cord, and a hook at the front end of said cord for receiving the reins, substantially as described.

In testimony whereof I have signed my name to this specification in the presence of two subscribing witnesses.

FRANCIS J. THOMAS.

Witnesses:
JANET E. HOGAN,
HELEN F. LILLIS.